Figure 1:
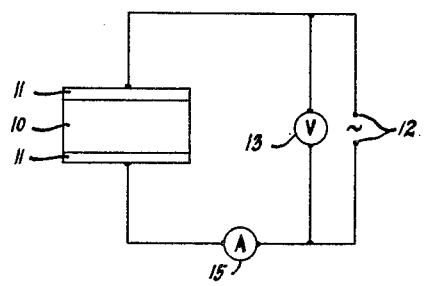

June 30, 1953          H. SCHARF          2,643,434

PROCESS FOR MAKING CERAMIC PARTS

Filed July 22, 1950

INVENTOR

HERBERT SCHARF

BY Marechal & Biebel

ATTORNEYS

UNITED STATES PATENT OFFICE 2,643,434

PROCESS FOR MAKING CERAMIC PARTS

Herbert Scharf, Augsburg, Germany, assignor to Maschinenfabrik Augsburg-Nürnberg A. G., Augsburg, Germany, a corporation of Germany Application July 22, 1950, Serial No. 175,447
In Germany October 11, 1949

8 Claims. (Cl. 25—157)

This invention relates to a process for the production of sintered ceramic parts such as machine parts and the like.

The invention has particular relation to the production of parts such as turbine blades for gas turbines which are subject to severe requirements with respect to mechanical soundness at the high operating temperatures and abrupt temperature changes of gas turbines in use. Both of these conditions can be met by suitable selection of the composition from which the parts are made, for example by incorporating particles of a material which is a good conductor of heat in mechanically sound basic materials, providing the sintering operation is carried out under adequately controlled conditions to give mechanical soundness throughout the part.

Where the sintering operation is carried out as a direct heating operation such as in a furnace, the sintering temperatures are developed in the part by conduction from without, and there is a tendency to create temperature gradients which can be kept within tolerable limits only by slow increase in the applied heat. As a result, such ceramic firing operations tend to be uneconomical, and they may lead to conditions of possible danger particularly in the case of machine parts of substantial size, since there is a tendency for such parts to sinter non-uniformly and thus to have varying properties of mechanical soundness which may prove highly undesirable in the operation of the apparatus in which the part is to be used.

The present invention provides a process by which these difficulties are obviated by generating the sintering temperatures directly in the body of the ceramic part by the application of electrical energy to the part from without. In carrying out the process, the parts are sintered from ceramic starting materials which are partially electrically conductive and have incorporated therein particles of a material which is a good conductor of heat, such for example as silicon carbide, and it has been found that parts sintered from such semi-conducting ceramic materials have characteristic properties of soundness and electrical conductivity when the sintering is carried out by a progressive process. Thus if the conductivity of the part is low, this indicates that the mechanical connection between the particles therein is poor. With increasing sintering temperatures, the conductive particles or granules in the part appear to draw nearer to each other, and if their basic form assumes a fine crystalline structure, then the electrical conductivity and the mechanical soundness of the part reaches a maximum, a fine crystalline structure being the most sound mechanically.

Thus the invention provides a process for sintering ceramic parts in which the progress of the sintering action can be followed by observation of the current used to apply electrical energy to the part. In this way the firing of the part can be terminated at the particular point in the sintering operation at which the material therein has the desired properties of electrical conductivity and mechanical soundness, it being noted that although electrical conductivity and mechanical soundness do not always reach their maximum simultaneously, depending upon the starting material, a certain conductivity can always be associated with a predetermined mechanical condition. As a result, once the relationship between conductivity and soundness for a particular starting material has been determined, the desired soundness of the parts sintered therefrom can be determined and controlled in accordance with the conductivity of the part developed during the sintering process.

It is accordingly one of the principal objects of the present invention to provide a process for the production of sintered ceramic parts in which the sintering temperatures are developed in the part itself by application of electrical energy thereto under controlled conditions such that substantially uniform temperatures are obtained throughout the part at each instant and in which attainment of the desired sintering conditions is determined by a change in the electrical characteristics such as the dielectric or conductive properties of the part in accordance with a predetermined relationship of these properties with the mechanical soundness of the part.

Another object is to provide such a process in which the sintering temperatures are generated in the part in accordance with electrical resistance thereof by directly connecting the part in an electrical circuit and in which development of the desired conditions of mechanical soundness is controlled in accordance with the observed current changes in the heating circuit.

It is also an object of the invention to provide such a process in which the sintering temperatures are developed in the part by dielectric heating in a high frequency alternating electrical field and in which development of the desired conditions of mechanical soundness is controlled in accordance with the observed current changes in the high frequency circuit.

Other objects and advantages of the invention will be apparent from the following description, the accompanying drawing and the appended claims.

In the drawing—

Figure 2:
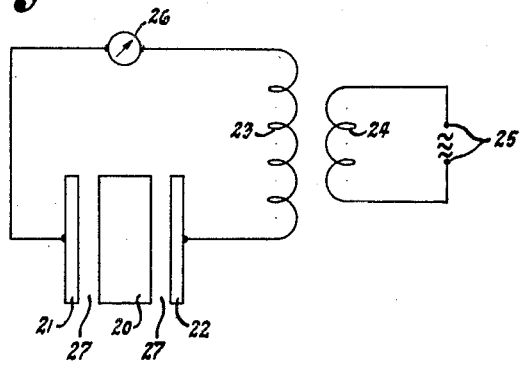

Fig. 1 is a wiring diagram illustrating a circuit for carrying out the sintering process of the invention by electrical resistance heating; and Fig. 2 is a wiring diagram illustrating a circuit for carrying out the sintering process of the invention in a high frequency alternating electrical field by dielectric heating.

In carrying out the process of the invention, the entire sintering operation may be carried out by the application of electrical energy to the part to be sintered, or if desired the part may initially be partially sintered by heating in a furnace or by any other suitable way, in which event only the final phase of the firing is carried out by application of electrical energy to the part. Thus referring to the drawing, which illustrates preferred embodiments of the invention, Fig. 1 shows a wiring diagram for carrying out the sintering process of the invention by electrical resistance heating on a ceramic part represented diagrammatically at 10. The electrodes 11 are in electric contact with the part 10 to provide for conducting the current from the source of alternating voltage 12 directly through the entire body of the part so that sintering temperatures are developed directly in the part as the result of its own electrical resistance, and changes in the conductivity of the part as the process continues are readily observed by means of the voltmeter 13 and ammeter 15.

In carrying out the process of the invention as illustrated in Fig. 1, after the part 10 has been connected to the electrodes 11, the current is turned on to effect the desired heating. As the sintering progresses, the resistance of the part 10 will decrease until it reaches a minimum when the desired optimum conditions of mechanical soundness are obtained throughout the part as previously described. The progress of this development is readily observed by means of the ammeter 15, and when the current flow reaches a maximum, the operator will know that the desired conditions have been established in the part and that the sintering operation should accordingly be terminated.

As an illustrative example of the process of the invention as illustrated in Fig. 1, if the part 10 represents a circular plate 7.0 centimeters in diameter and 2.5 centimeters in thickness formed of a mixture of ceramic materials consisting of 75% steatite and 25% silicon carbide, the desired sintering temperature is 1300° C. This temperature condition can be reached in about 10 minutes with the circuit shown in Fig. 1 using a voltage source 12 of about 100 volts, and a maximum current flow as shown by ammeter 15 of approximately 15 amperes, which indicates completion of the sintering operation. The capacity therefore always amounts to 1.5 kw. The voltage must be readjusted during the sintering operation, because resistance of the test body varies.

Fig. 2 illustrates the application of the sintering process of the invention to a ceramic part 20 by interposing the part in a high frequency alternating electrostatic field between condenser plates 21 and 22 in the secondary circuit of a high frequency transformer having windings 23 and 24, the primary winding 24 being connected to a suitable high frequency source 25. An ammeter or other suitable instrument for measuring the current flow and hence the resonance of the oscillating circuit is indicated at 26.

In carrying out the process of the invention as illustrated in Fig. 2, the part 20 is interposed in the high frequency alternating field between the plates 21 and 22, each plate being separated from the part 20 by an air gap 27 sufficient to prevent direct contact. Since the part 20 is composed largely of materials having a relatively high dielectric loss factor, it becomes heated in the field in such manner that the heat originates and is developed as dielectric phase output in all parts thereof internally as well as externally, so that overall uniform heating takes place without undesired temperature gradients, uniform permeation of the part by the field, and therefore the desired uniform heating, being assured by appropriate formation and disposition of the electrodes 21 and 22 with respect to the size and shape of the particular part to be fired. The progress of the firing can be controlled by observation of the resonance of the high frequency generator, by means of the ammeter 26, so that it can be interrupted at the point at which the electrical properties of the part indicate that the desired mechanical condition therein has been obtained.

As an illustrative example of the process of the invention as shown in Fig. 2, a desired sintering temperature of 1300° C. in a part 20 of the same dimensions and composition described in connection with Fig. 1 can be reached in about ten minutes when the power is supplied from the source 25 at an output of 1.2 kilowatts and a frequency of 21 MHz. In the last part of the firing process, the current in the oscillating circuit mounts slowly until it reaches its maximum at the desired sintering temperature. The process is then discontinued by turning off the generator or physically removing the part from the field before the current begins to decline, which it will do if the process is continued beyond the optimum point. In this way the objective of the process is obtained in that the firing is terminated when the optimum condition of mechanical soundness in the part is reached as determined by the maximum current flow corresponding to the resonant condition in the circuit.

While the processes herein described constitute preferred embodiments of the invention, it is to be understood that the invention is not limited to these precise processes, and that changes may be made therein without departing from the scope of the invention which is defined in the appended claims.

What is claimed is:

1. A process for the production of sintered machine construction parts adapted to withstand severe mechanical stresses at high temperatures and abrupt changes in temperature from ceramic semi-conducting materials which includes the steps of applying electrical energy directly to the entire body of said part to develop a sintering temperature internally throughout said body, maintaining the application of electrical energy to said part for a substantial time interval with resulting increase in the conductivity of said part as said temperature increases, measuring said increase in the conductivity of said part during said time interval, and terminating the application of electrical energy to said part when said measured conductivity reaches a predetermined maximum value and before said measured conductivity begins to decrease appreciably from said maximum.

2. A process for the production of sintered machine construction parts adapted to withstand severe mechanical stresses at high temperatures and abrupt changes in temperature from ceramic semi-conducting materials which includes the steps of applying electrical energy directly to the entire body of said part to develop a sintering temperature internally throughout said body, maintaining the application of electrical energy to said part for a substantial time interval with resulting increase in the conductivity of said part as said temperature increases, and controlling the mechanical characteristics of said sintered part in accordance with the change in the electrical characteristics of said part as said electrical energy is applied by measuring said increase in the conductivity of said part during said time interval and by terminating the application of electrical energy to said part when said measured conductivity thereof reaches a predetermined maximum and before said measured conductivity begins to decrease appreciably from said maximum.

3. A process for the production of sintered machine construction parts adapted to withstand severe mechanical stresses at high temperatures and abrupt changes in temperature from ceramic semi-conducting materials which includes the steps of applying electrical energy directly to said part by an electric circuit to develop a sintering temperature throughout said part, maintaining said application of electrical energy to said part for a substantial time interval with resulting increase in the current flow in said circuit as said temperature increases, measuring said increase in current flow during said time interval, and interrupting the application of electrical energy to said part when said measured current flow in said circuit reaches a maximum and before said current flow begins to decrease appreciably from said maximum.

4. In a process for sintering machine construction parts adapted to withstand severe mechanical stresses at high temperatures and abrupt changes in temperature from semi-conducting ceramic materials, the steps of partially sintering said part, then applying electrical energy to said part by an electrical circuit to develop a sintering temperature throughout said part, maintaining said application of electrical energy to said part for a substantial time interval with resulting increase in the current flow in said circuit as said temperature increases, measuring said change in current flow during said time interval, and interrupting the application of electrical energy to said part when said measured current flow in said circuit reaches a predetermined maximum and before said current flow begins to decrease appreciably from said maximum.

5. A process for the production of sintered machine construction parts adapted to withstand severe mechanical stresses at high temperatures and abrupt changes in temperature from semi-conducting ceramic materials which comprises the steps of connecting said part in an electrical circuit, passing current through said circuit to develop a sintering temperature throughout said part in accordance with the electrical resistance thereof, maintaining the passage of current through said circuit for a substantial time interval with resulting increase in the electrical conductivity of said part, measuring said increase in conductivity during said time interval, and interrupting said circuit when said measured conductivity of said part reaches a predetermined maximum and before said conductivity appreciably decreases from said maximum.

6. A process for the production of sintered machine construction parts adapted to withstand severe mechanical stresses at high temperatures and abrupt changes in temperature from semi-conducting ceramic materials which comprises the steps of generating a high frequency electrostatic field, interposing said part in said electrostatic field to develop a sintering temperature therein through dielectric loss, maintaining said part in said field for a substantial time interval with resulting increase in the conductivity of said part as said temperature increases, measuring said increase in conductivity while said part is interposed in said field, and separating said part from said field when said measured conductivity reaches a predetermined maximum and before said measured conductivity begins to decrease appreciably from said maximum.

7. A process for the production of sintered machine construction parts adapted to withstand severe mechanical stresses at high temperatures and abrupt changes in temperature from semi-conducting ceramic materials which comprises the steps of generating a high frequency electrostatic field, interposing said part in said electrostatic field to develop a sintering temperature therein through dielectric loss, maintaining said part in said field for a substantial time interval with resulting increase in the conductivity of said part as said temperature increases, measuring said increase in conductivity while said part is interposed in said field, and separating said part from said field when said measured conductivity reaches a predetermined maximum value and before said measured conductivity begins to decrease appreciably from said maximum.

8. A process for the production of sintered gas turbine blades and like machine construction parts from semi-conducting ceramic materials which comprises the steps of generating a high frequency electrostatic field in an oscillating circuit, interposing said part in said electrostatic field to develop a sintering temperature therein through dielectric loss, maintaining said part in said field for a substantial time interval with resulting increase in the conductivity of said part and increase in the current flow in said oscillating circuit as said temperature increases, measuring said increase in current flow during said time interval, and separating said part from said field when said measured current flow in said oscillating circuit reaches a maximum and before said current flow appreciably decreases from said maximum.

HERBERT SCHARF.

References Cited in the file of this patent
UNITED STATES PATENTS

| Number | Name | Date |
| --- | --- | --- |
| 1,430,724 | d'Adrian | Oct. 3, 1922 |
| 1,997,263 | Meissner | Apr. 9, 1935 |
| 2,233,176 | Melton et al. | Feb. 25, 1941 |